United States Patent
Magill et al.

(10) Patent No.: US 12,478,332 B2
(45) Date of Patent: Nov. 25, 2025

(54) MOUNTING AND LOCKING MECHANISMS FOR A PATIENT MONITORING SYSTEM

(71) Applicant: DRAEGER MEDICAL SYSTEMS, INC., Andover, MA (US)

(72) Inventors: John C. Magill, Woburn, MA (US); Clifford Risher-Kelly, Wells, ME (US); Joseph Fallon, Brunswick, ME (US); Peter A. Lund, Nashua, NH (US)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 0 days.

(21) Appl. No.: 18/271,421

(22) PCT Filed: Dec. 29, 2021

(86) PCT No.: PCT/EP2021/087773
§ 371 (c)(1),
(2) Date: Jul. 7, 2023

(87) PCT Pub. No.: WO2022/144380
PCT Pub. Date: Jul. 7, 2022

(65) Prior Publication Data
US 2024/0057947 A1    Feb. 22, 2024

Related U.S. Application Data

(60) Provisional application No. 63/132,159, filed on Dec. 30, 2020.

(51) Int. Cl.
*A61B 5/00* (2006.01)
*G06F 1/16* (2006.01)
(Continued)

(52) U.S. Cl.
CPC .......... *A61B 5/7445* (2013.01); *G06F 1/1632* (2013.01); *G06F 1/1681* (2013.01);
(Continued)

(58) Field of Classification Search
CPC ........ G06F 1/1601–1624; G06F 1/1632–1633; G06F 1/1647–165; G06F 1/1654;
(Continued)

(56) References Cited

U.S. PATENT DOCUMENTS

| | | |
|---|---|---|
| 4,512,623 A | 4/1985 | Tomsa |
| 4,577,917 A | 3/1986 | Nashimoto |

(Continued)

FOREIGN PATENT DOCUMENTS

| | | |
|---|---|---|
| CN | 102005660 A | 4/2011 |
| CN | 102017327 A | 4/2011 |

(Continued)

OTHER PUBLICATIONS

International Search Report and the Written Opinion for corresponding International PCT Application No. PCT/EP2019/067781, dated Oct. 14, 2019, 15 pages.

(Continued)

*Primary Examiner* — Keith L Crawley
(74) *Attorney, Agent, or Firm* — NOLTE LACKENBACH SIEGEL

(57) ABSTRACT

A patient monitor system includes a monitor mount, a first monitor, and a second monitor adapted to provide for data and power transfer between the monitors and the mount. The monitor mount may detachably secure the second monitor, and the second monitor can detachably secure (or otherwise physically interface with) the first monitor. The first monitor may be first mounted or otherwise detachably secured to the second monitor to form an expanded monitor system, and the monitor system may be then detectably secured to the monitor mount. Alternatively, the second monitor may be first mounted or otherwise detachably secured to the monitor mount, and the first monitor may be subsequently inserted into or otherwise mounted within a mounting area defined (Continued)

by the second monitor, the monitor mount, or both the second monitor and the monitor mount.

18 Claims, 9 Drawing Sheets

(51) Int. Cl.
   *G06F 3/14*      (2006.01)
   *G16H 40/63*     (2018.01)

(52) U.S. Cl.
   CPC ...... *G06F 3/1454* (2013.01); *A61B 2560/045* (2013.01); *A61B 2560/0456* (2013.01); *G16H 40/63* (2018.01)

(58) Field of Classification Search
   CPC ...... G06F 1/1656; G06F 1/166; G06F 1/1675; G06F 1/1679–1684; G06F 3/1454; G16H 40/60–63; A61B 5/0002; A61B 5/74; A61B 5/742–745; A61B 5/7465–7475; A61B 2560/0431–0456
   See application file for complete search history.

(56) References Cited

U.S. PATENT DOCUMENTS

| | | | |
|---|---|---|---|
| 4,808,126 A | 2/1989 | Wilson | |
| 4,869,677 A | 9/1989 | Johnson | |
| 4,986,769 A | 1/1991 | Adams, III | |
| 5,032,089 A | 7/1991 | Hansell, III | |
| 5,104,329 A | 4/1992 | Brown | |
| 5,790,375 A | 8/1998 | Lee | |
| 5,975,957 A | 11/1999 | Noda | |
| 6,183,417 B1 | 2/2001 | Geheb | |
| 6,647,248 B1* | 11/2003 | Ortscheid | B60R 11/0241 379/426 |
| 6,716,058 B2 | 4/2004 | Youn | |
| 6,808,428 B1 | 10/2004 | Korsunsky | |
| 6,976,885 B2 | 12/2005 | Lord | |
| 7,201,612 B1 | 4/2007 | Hou | |
| 7,738,238 B2 | 6/2010 | Liu | |
| 7,808,779 B2 | 10/2010 | Lum et al. | |
| 7,857,656 B2 | 12/2010 | Tai | |
| D640,206 S | 6/2011 | Stirling | |
| 8,323,059 B1 | 12/2012 | Song | |
| 8,460,016 B2 | 6/2013 | Liu | |
| 8,517,756 B2 | 8/2013 | Song | |
| 8,780,546 B2 | 7/2014 | Zhou | |
| 8,780,548 B2 | 7/2014 | Lee | |
| 9,131,904 B2 | 9/2015 | Qualey | |
| 9,153,112 B1* | 10/2015 | Kiani | A61B 5/02438 |
| 9,166,339 B2 | 10/2015 | Sakakura | |
| 9,168,006 B2 | 10/2015 | Georgiev | |
| 9,182,786 B2 | 11/2015 | Meertens | |
| 9,207,714 B2 | 12/2015 | Boomhour | |
| 9,429,994 B1 | 8/2016 | Vier | |
| 9,436,645 B2 | 9/2016 | Al-Ali | |
| 9,439,574 B2 | 9/2016 | McCombie | |
| 9,535,457 B1 | 1/2017 | Vier | |
| 9,760,116 B2 | 9/2017 | Wylie | |
| 9,845,912 B2 | 12/2017 | Phillips | |
| D807,514 S* | 1/2018 | Eslava | D24/186 |
| 9,891,666 B2 | 2/2018 | Buss | |
| 9,973,013 B2 | 5/2018 | Yan | |
| 10,101,770 B2 | 10/2018 | Schatz | |
| 10,918,281 B2 | 2/2021 | Al-Ali | |
| 11,605,188 B2 | 3/2023 | Al-Ali | |
| 2002/0082479 A1 | 6/2002 | Frangesch | |
| 2003/0167074 A1 | 9/2003 | Merry | |
| 2005/0288571 A1 | 12/2005 | Perkins | |
| 2006/0092605 A1 | 5/2006 | Deluga et al. | |
| 2006/0104018 A1 | 5/2006 | Tracy | |
| 2006/0171044 A1 | 8/2006 | Carnevali | |
| 2006/0229502 A1 | 10/2006 | Pollock | |
| 2007/0035917 A1 | 2/2007 | Hotelling et al. | |
| 2008/0108884 A1 | 5/2008 | Kiani | |
| 2008/0273734 A1 | 11/2008 | Solland | |
| 2009/0009957 A1 | 1/2009 | Crooijmans | |
| 2010/0108828 A1 | 5/2010 | Yu | |
| 2010/0179408 A1 | 7/2010 | Kamath | |
| 2010/0261979 A1 | 10/2010 | Kiani | |
| 2011/0054268 A1* | 3/2011 | Fidacaro | G06F 1/16 361/679.01 |
| 2011/0075349 A1 | 3/2011 | Ma | |
| 2012/0099271 A1* | 4/2012 | Hsu | G06F 1/181 361/679.58 |
| 2012/0127103 A1* | 5/2012 | Qualey | A61B 5/002 345/173 |
| 2012/0175474 A1 | 7/2012 | Barnard | |
| 2012/0194327 A1 | 8/2012 | Schuman, Sr. | |
| 2012/0273630 A1 | 11/2012 | Gillespie-Brown | |
| 2013/0026322 A1 | 1/2013 | Wheeler | |
| 2013/0104364 A1 | 5/2013 | Carnevali | |
| 2013/0107449 A1 | 5/2013 | Su | |
| 2013/0202269 A1 | 8/2013 | Pollock | |
| 2013/0262730 A1 | 10/2013 | Al-Ali | |
| 2013/0277520 A1* | 10/2013 | Funk | G06F 1/1626 248/274.1 |
| 2014/0113481 A1 | 4/2014 | Little | |
| 2014/0159921 A1 | 6/2014 | Qualey | |
| 2014/0168884 A1 | 6/2014 | Wylie | |
| 2014/0194700 A1* | 7/2014 | Ikeya | A61B 5/742 600/300 |
| 2014/0201414 A1 | 7/2014 | Keegan | |
| 2014/0263929 A1* | 9/2014 | Grziwok | G06F 1/1656 248/553 |
| 2014/0357966 A1* | 12/2014 | Al-Ali | A61B 5/14532 600/301 |
| 2015/0362953 A1 | 12/2015 | Shindo | |
| 2015/0380804 A1* | 12/2015 | Lim | G06F 1/1654 343/702 |
| 2016/0224065 A1 | 8/2016 | Weldon | |
| 2016/0255531 A1 | 9/2016 | Stein | |
| 2016/0309010 A1 | 10/2016 | Carnevali | |
| 2016/0352382 A1 | 12/2016 | Andrus | |
| 2017/0264045 A1 | 9/2017 | Eslava et al. | |
| 2018/0080597 A1 | 3/2018 | Weldon | |
| 2018/0083387 A1 | 3/2018 | Preuss | |
| 2018/0107248 A1* | 4/2018 | Pischel | H05K 5/0221 |
| 2018/0130325 A1 | 5/2018 | Kiani | |
| 2018/0146562 A1* | 5/2018 | Carnevali | F16M 11/2078 |
| 2018/0242921 A1 | 8/2018 | Muhsin | |
| 2018/0242926 A1 | 8/2018 | Muhsin | |
| 2018/0256111 A1 | 9/2018 | Ganapathy | |
| 2019/0069778 A1 | 3/2019 | Pourhoseini | |
| 2019/0183435 A1 | 6/2019 | Eslava | |
| 2019/0250664 A1* | 8/2019 | Eslava | A61B 5/742 |
| 2020/0110442 A1 | 4/2020 | Eslava | |
| 2020/0335913 A1 | 10/2020 | Lund | |
| 2020/0371548 A1* | 11/2020 | Lund | H01R 33/97 |
| 2021/0057851 A1* | 2/2021 | Lund | H01R 13/50 |
| 2021/0120690 A1 | 4/2021 | Stalter | |
| 2022/0077633 A1 | 3/2022 | Provencher | |
| 2022/0104779 A1* | 4/2022 | Lund | A61B 5/7445 |
| 2024/0050044 A1 | 2/2024 | Risher-Kelly | |
| 2024/0134412 A1 | 4/2024 | Lund et al. | |

FOREIGN PATENT DOCUMENTS

| | | |
|---|---|---|
| CN | 102133097 A | 7/2011 |
| CN | 102427188 A | 4/2012 |
| CN | 103779711 A | 5/2014 |
| CN | 109792119 A | 5/2019 |
| DE | 102015014492 A1 | 5/2017 |
| DE | 202016008631 | 9/2018 |
| IT | V120110329 A1 | 6/2013 |
| TW | 409587 U | 8/2011 |

(56) References Cited

FOREIGN PATENT DOCUMENTS

| TW | 566934 U | 9/2018 |
|---|---|---|
| WO | 2018125572 A1 | 7/2018 |

OTHER PUBLICATIONS

International Search Report and Written Opinion for corresponding to International PCT Application No. PCT/EP2021/08627, dated Jun. 30, 2022, 17 pages.
European Office Action for corresponding European Application No. 21843885.1, dated Apr. 4, 2024, 6 pages.
China Search Report for corresponding China Application No. 201980086736.6, dated Jan. 31, 2023, 2 pages.
International Search Report and the Written Opinion for corresponding International PCT Application No. PCT/EP2019/087117, dated Mar. 17, 2020, 12 pages.
China Search Report for corresponding China Application No. 201980086726.2 dated Jan. 19, 2023, 2 pages.

\* cited by examiner

MOUNTING AND LOCKING MECHANISMS FOR A PATIENT MONITORING SYSTEM

RELATED APPLICATIONS

This document is a nationalization of International Application No. PCT/EP2021/087773, filed Dec. 29, 2021, under 35 U.S.C. § 371, which claimed the priority of U.S. Application Ser. No. 63/132,159, filed Dec. 30, 2020. The content of both International Application No. PCT/EP2021/087773 and U.S. Application Ser. No. 63/132,159 is hereby incorporated by reference for all purposes, including the right for priority, as if set forth verbatim herein.

TECHNICAL FIELD

The present disclosure generally relates to a patient monitor system having a mount, a smaller monitor, and a larger monitor that is adapted to removably receive the smaller monitor, with the smaller monitor and/or the larger monitor configured to be removably attached to the mount alone or in combination, and to provide for data and power transfer between the monitors and the mount.

DESCRIPTION OF THE RELATED ART

Monitors that include electronic visual displays are utilized in a large number of applications within a wide variety of industries including, for example, the healthcare industry, the military, and the oil and gas industry. Many of the applications within such industries require such monitors to, at times, be portable, and, at other times, be stationary. For example, in the healthcare industry, when not being used in transport of a patient or when a patient is ambulatory, monitors can be connected to a monitor mount. Such monitor mounts can provide a variety of functions including providing physical support, a power source, and a conduit to one or more computer networks.

One type of monitor is a patient monitor which is used by healthcare facilities to monitor and display information about a patient, such as vital signs, status of connected devices (e.g., physiological sensors, etc.), and the like. Patient monitors may be portable devices that travel with the patient in order to provide continuous monitoring during care. When a patient arrives at a hospital room or other treatment location, the patient monitor may be plugged into or otherwise connected to a patient monitor mount. Patient monitor mounts may provide a physical interface for the patient monitor and are generally fixed to the treatment location. Patient monitor mounts may also provide electrical connection to other devices or infrastructure, such as power to recharge patient monitor batteries, network connectivity to other medical devices or hospital computer systems, and the like.

During the course of providing healthcare to patients, practitioners may connect at least one type of sensor to a patient to sense, derive or otherwise monitor at least one type of patient medical parameter. Such patient connected sensors may further be connected to the monitor that includes all relevant electronic components that permit conversion, manipulation and processing of the data sensed by the at least one type of sensor in order to generate patient medical parameters. These patient medical parameters may be stored in one or more modules and are usable by healthcare practitioners (e.g., nurses, doctors, physician assistants, or any other person charged with providing a healthcare service to a patient) in monitoring a patient and determining a course of healthcare to be provided to the patient. Additionally, or alternatively, the one or more modules may contain data, such as patient treatment data, to be transferred to monitor mount and/or the monitor.

A monitor may be selectively connected to a patient at any point during which a healthcare professional comes into contact with the patient and may remain connected with the patient as the patient moves through various locations within a particular healthcare enterprise (e.g., hospital) or between different healthcare enterprises (e.g., an ambulance and/or different medical facilities). The monitor and/or the module may allow data representing the at least one patient medical parameter to be communicated to other systems within the healthcare enterprise. This data may then be used by different systems in further patient care.

In view of the foregoing, there is a need for a modular system that permits additional options for engaging and disengaging a small monitor and a large monitor from the mount as well as enhanced ease of use.

SUMMARY

Embodiments described herein relate to a patient monitor system having a mount, a smaller monitor (first monitor), and a larger monitor (second monitor) that is adapted to removably receive the smaller monitor, with the smaller monitor and/or the larger monitor configured to be removably attached to the mount alone or in combination, and to provide for data and power transfer between the monitors and the mount.

A monitor mount may detachably secure a second monitor and the second monitor can detachably secure the first monitor. The first monitor may be mounted or otherwise detachably secured to the second monitor to form an expanded monitor system and the monitor system may be then detachably secured to the monitor mount. Alternatively, the second monitor may be first mounted or otherwise detachably secured to the monitor mount, and the first monitor may be subsequently inserted into or otherwise mounted within a mounting area defined by the second monitor, the monitor mount, or both the second monitor and the monitor mount.

Therefore, the example system provides an interconnected, versatile, and comprehensive patient care solution with a high degree of configurability to accommodate different or dynamically changing environments. Accordingly, the example systems thereby improve clinical workflow.

A monitor mount may detachably secure (or otherwise physically interface with) both of a first monitor and a second monitor, alone or in combination. The first monitor may have a shape and size which differs from that of the second monitor. Both of the first monitor and the second monitor may be concurrently or individually secured to the monitor mount.

BRIEF DESCRIPTION OF THE DRAWINGS

Embodiments are described herein making reference to the appended drawings.

DETAILED DESCRIPTION

Figure 1:
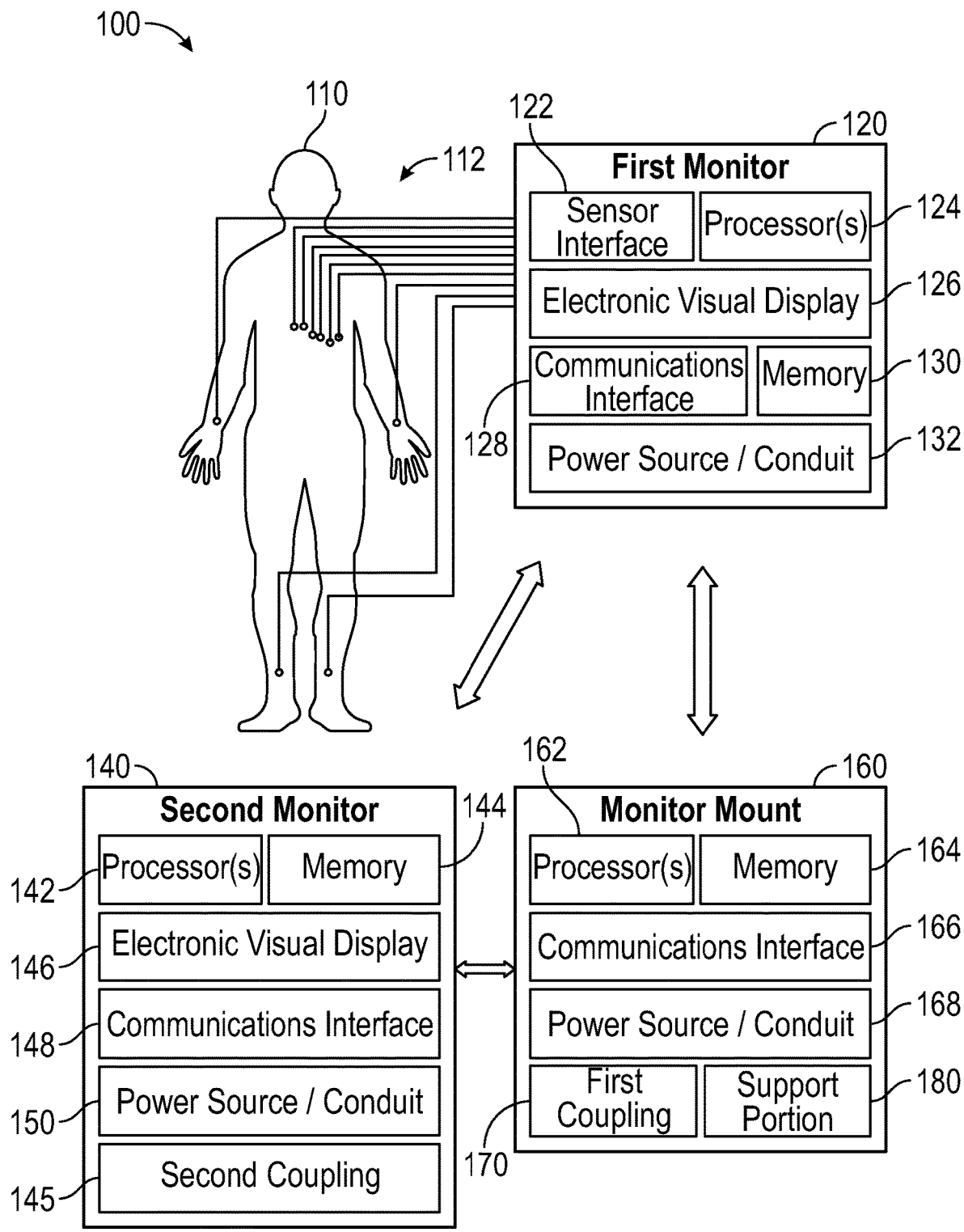
FIG. 1 is a logical diagram illustrating the example system including a first monitor, a second monitor, and a monitor mount.

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

For example, in the description of the figures that follow, the automatic power on apparatus, system, method, and circuit are implemented in patient monitors. However, it should be understood and appreciated by one of ordinary skill in the art that the automatic power on apparatus, system, method, and circuit of the present disclosure can be implemented in other medical or electronic devices. The implementation of the automatic power on apparatus, system, method, and circuit in the patient monitors is meant only to assist in the understanding of the present disclosure and in no way is meant to limit the implementation the automatic power on apparatus, system, method, and circuit described herein.

Additionally, the terms and words used in the following description and claims are not limited to the bibliographical meanings, but are merely used to permit a clear and consistent understanding of the present disclosure. Accordingly, it will be apparent to those skilled in the art that the following description of the present disclosure is provided for illustration purposes only, and not for the purpose of limiting the present disclosure as defined by the appended claims and their equivalents.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It is to be understood that the singular forms "a", "an", and "the", include plural referents unless the context clearly dictates otherwise. Thus, for example, reference to "a processor" or "a memory" includes reference to one or more of such processors or memories.

The expressions such as "include" and "may include" which may be used in the present disclosure denote the presence of the disclosed functions, operations, and constituent elements, and do not limit the presence of one or more additional functions, operations, and constituent elements. In the present disclosure, terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

The subject matter described herein is directed to systems and apparatuses directed to monitors (e.g., display monitors having visual electronic displays) and monitor mounts providing physical support and, in some cases, power and access to a communications/computer network. Use of such systems and apparatuses can, for example, occur in a medical environment such as the scene of a medical event, an ambulance, a hospital or a doctor's office. When a patient undergoes initial patient monitoring in such an environment, a minimum set of sensors can be connected to a patient to collect various types of patient information (e.g., physiological information) as described in detail herein. As a patient is moved from one area of care within the medical environment to another area of care, the patient monitor can travel with the patient. In some situations, the patient monitor can be mounted to a monitor mount to provide for stationary observation of the patient information on a visual electronic display. During the course of patient monitoring, the number of sensors can also increase due to increased testing and/or monitoring of the patient. In such a scenario, a patient monitor initially monitoring the patient can be docked onto a monitor mount having a second, larger monitor in order to expand the number of sensors available for patient monitoring and/or increase the number of patient parameters on a single visual electronic display by docking the smaller patient monitor to or within a larger patient monitor. The initial patient monitor can either remain within the larger patient monitor or be removed from the larger patient monitor.

One type of patient monitoring system comprises a small monitor having patient connected sensors, a larger monitor that is adapted to removably receive the small monitor, and a mount (typically wall or pedestal mounted) that is adapted to removably secure the large monitor (either with or without the small monitor attached) and to provide data and power connections to the hospital network. Providing both small and large monitors permits the small monitor to stay with the patient throughout medical treatment, while providing enhanced display and user input capabilities provided by the larger monitor.

This type of system presents challenges for health care personnel when engaging and disengaging the small monitor, large monitor, and mount from each other. In addition, it is desirable to permit individual components to be engaged or disengaged on combinations not permitted by existing mount systems. The presently disclosure is directed to methods and apparatus to eliminate, or at least mitigate, these and other challenges.

FIG. 1 is a logical diagram illustrating an example system 100 including a first monitor 120, a second monitor 140, and a monitor mount 160. In an implementation, monitor mount 160 may be detachably secured to a support structure (not shown) (e.g., a wall-mounted arm) via any attachment mechanism (not shown) such as a Video Electronics Standards Association (VESA) mounting interface adapted to an attachment mechanism in a hospital room in which a patient 110 is being monitored and/or treated via one or more modules, for example one or more physiological sensors and/or medical devices.

Monitor mount 160 may detachably secure second monitor 140, and second monitor 140 may detachably secure (or otherwise physically interface with) first monitor 120. First monitor 120 may be first mounted or otherwise detachably secured to second monitor 140 to form a two-monitor system 100, and monitor system 100 may be then detachably secured to monitor mount 160. Alternatively, second monitor 140 may be first mounted or otherwise detachably secured to monitor mount 160, and first monitor 120 may be subsequently inserted into or otherwise mounted within a mounting area defined by second monitor 140, monitor mount 160, or both second monitor 140 and monitor mount 160. For example, the mounting area may be defined by a volume or cavity formed when second monitor 140 and monitor mount 160 are coupled together.

Therefore, example system 100 may provide an interconnected, versatile, and comprehensive patient care solution with a high degree of configurability. Example system 100 may acquire data at the bedside and on transport, without having to disconnect a patient as he or she is moved from care area to care area. Example system 100 may be scaled depending on the patient's changing acuity level and medical devices can be customized to better suit hospital protocols and use models. Accordingly, example system 100 thereby improves clinical workflow.

Monitor mount 160 may detachably secure (or otherwise physically interface with) both of first monitor 120 and second monitor 140, alone or in combination. As will be described in further detail below, first monitor 120 has a shape and size which differs from that of second monitor 140. Nonetheless, both of first monitor 120 and second monitor 140 are able to be concurrently secured to monitor mount 160.

First monitor 120 may, for example, be a patient monitor that may be used to monitor various physiological parameters for a patient 110. With such a variation, first monitor 120 may include a sensor interface 122 used to connect via wired and/or wireless interfaces to one or more physiological sensors and/or medical devices 112 (e.g., electrocardiogram (ECG) electrodes, oxygen saturation (SpO2) sensor, non-invasive blood pressure (NIBP), blood pressure cuffs, apnea detection sensors, end-tidal carbon dioxide (etCO2), respirators, temperature, and other similar physiological data) associated with the patient 110. First monitor 120 may include one or more processors 124 (e.g., programmable data processors, etc.) which may execute various instructions stored in memory 130 of first monitor 120. Various data and graphical user interfaces may be conveyed to a user via an electronic visual display 126 included in first monitor 120. This information may, for example, relate to the measured physiological parameters of patient 110 and the like (e.g., ECG waveforms, blood pressure, heart related information, pulse oximetry, respiration information, temperature, etc.). Other types of information may also be conveyed by electronic visual display 126. In some variations, the electronic visual display 126 includes a touch screen interface that allows a user of first monitor 120 to input data and/or modify the operation of first monitor 120.

First monitor 120 may additionally include a communications interface 128 which allows first monitor 120 to directly or indirectly (via, for example, monitor mount 160) access one or more computing networks. Communications interface 128 may include various network cards/interfaces to permit wired and wireless communications with such computing networks. Communications interface 128 may also permit direct (i.e., device-to-device, etc.) communications (i.e., messaging, signal exchange, etc.) such as from monitor mount 160 to first monitor 120.

First monitor 120 can optionally also include a power source and/or conduit 132 that can be used to power the various components of first monitor 120 (and optionally various components of second monitor 140 and/or monitor mount 160). The power source/conduit 132 may include a self-contained power source such as a battery pack and/or the power source/conduit 132 may include an interface to be powered through an electrical outlet (either directly or indirectly by way of second monitor 140 and/or monitor mount 160). In some variations, first monitor 120 may only be powered and render information when secured or otherwise connected to one or more of second monitor 140 and monitor mount 160.

Second monitor 140 may include one or more processors 142 (e.g., programmable data processors, etc.) which may execute various instructions stored in memory 144 of second monitor 140. Various data and graphical user interfaces may be conveyed to the user via an electronic visual display 146 included in second monitor 140. This information may, for example, relate to the measured physiological parameters of the patient 110 and the like (e.g., blood pressure, heart related information, pulse oximetry, respiration information, thermoregulation, neonatal information, ventilator information, anesthesia information, incubation information, etc.) as received from first monitor 120. Other types of information may also be conveyed by the electronic visual display 146. In some variations, the electronic visual display 146 may include a touch screen interface that allows a user of second monitor 140 to input data and/or modify the operation of second monitor 140.

Second monitor 140 may additionally include a communications interface 148 which allows second monitor 140 to directly or indirectly (via, for example, first monitor 120 and/or monitor mount 160) access one or more computing networks. The communications interface 148 may include various network cards/interfaces to permit wired and wireless communications with such computing networks. The communications interface 148 may also permit direct (i.e., device-to-device, etc.) communications (i.e., messaging, signal exchange, etc.) such as from monitor mount 160 to second monitor 140 and first monitor 120 to second monitor 140.

Second monitor 140 may optionally also include a power source and/or conduit 150 that can be used to power the various components of second monitor 140 (and optionally various components of first monitor 120). The power source/conduit 150 may include a self-contained power source such as a battery pack and/or the power source/conduit 150 may include an interface to be powered through an electrical outlet (either directly or by way of first monitor 120 and/or monitor mount 160). In some variations, second monitor 140 may only be powered and render information when secured or otherwise connected to one or more of first monitor 120 and monitor mount 160.

Monitor mount 160 may include one or more processors 162 (e.g., programmable data processors, etc.) which may execute various instructions stored in memory 164 of monitor mount 160. Monitor mount 160 may additionally include a communications interface 166 which allows monitor mount 160 to directly or indirectly access one or more computing networks. The communications interface 166 may include various network cards/interfaces to permit wired and wireless communications with such computing networks. The communications interface 166 may also permit direct (i.e., device-to-device, etc.) communications (i.e., messaging, signal exchange, etc.) such as with first monitor 120 and/or second monitor 140.

Monitor mount 160 may optionally also include a power source and/or conduit 168 that may be used to power the various components of monitor mount 160 and/or first monitor 120 and/or second monitor 140 when secured to monitor mount 160. The power source/conduit 168 may include a self-contained power source such as a battery pack and/or the power source/conduit 168 may include an interface to be powered through an electrical outlet.

Any of the processors 124, 142, 162 may acquire data from any of monitor mount 160 and one or more of monitors 120, 140 and store the acquired data in a memory and, upon connection of monitor mount 160 and one or more of monitors 120, 140, transfer the data stored in the memory to monitor mount 160 or one or more of monitors 120, 140. The processors 124, 142, 163, and any other processor may include one or more microprocessors, central processing units (CPUs), digital signal processors (DSPs), application specific integrated circuits (ASICs), or any other equivalent integrated or discrete logic circuitry, as well as any combinations of such components and one or more sets of software. The data may include any of patient identification data including information identifying a patient; patient parameter data representing at least one type of patient parameter being monitored; and device configuration data including information associated with configuration settings for monitor mount 160 and/or one or more monitors 120, 140.

Monitor mount 160 may optionally also include any mounting interface, such as a VESA mounting interface for mounting monitor mount at the bedside, from the ceiling, on a wall of the room, or even outside the room for isolation purposes. An adjustable arm may be mounted to any of these locations. Monitor mount 160 may also include a mounting interface to allow it to be mounted from a workstation such as an anesthesia workstation in an operating room.

As will be described in greater detail below, monitor mount 160 has a shape and size which allows monitor mount 160 to detachably secure both of first monitor 120 and second monitor 140 such that the respective monitors 120 and 140 can be removed by the user when desired. Monitor mount 160 may secure each of first monitor 120 and second monitor 140 individually or both of first monitor 120 and second monitor 140 concurrently. In other words, the first coupling 170 may be configured to accept either first monitor 120 or second monitor 140 such that monitor mount 160 is configured to mount first monitor 120 alone, second monitor 140 alone, or a combination of first monitor 120 and second monitor 140.

The positioning of first monitor 120 when secured to monitor mount 160 may be such that the communications interface 128 on first monitor 120 aligns with the communications interface 166 of monitor mount 160 to allow, for example, a direct connection (e.g., electrical connection). In other variations, the communications interface 128 of first monitor 120 exchanges data with the communications interface 166 of monitor mount 160 wirelessly (via, for example, optical communication by way of respective optical windows on first monitor 120 and monitor mount 160). For example, both communication interfaces 128 and 166 may include bi-directional phototransceivers that are configured for bi-directional communication. The communications interface 128 of first monitor 120 may be located on a back facing portion of first monitor 120, whereas the communications interface 166 may be located on a front facing portion of monitor mount 160 so that the back facing portion and the front facing portion face each other when first monitor 120 is mounted to monitor mount 160.

The positioning of first monitor 120 when secured to monitor mount 160 may also align the power source/conduit 132 of first monitor 120 to be coupled to the power source/conduit 168 of monitor mount 160 to allow monitor mount 160 to power first monitor 120.

Monitor mount 160 may include a support portion 180 to allow second monitor 140 to be secured to monitor mount 160. The support portion 180 may be positioned at a top of monitor mount 160 or a bottom of monitor mount 160. The support portion 180 may include any mechanical attachment means such as a ledge, a rail, a rib, a detent, an abutment, a cleat, and the like, or any combination thereof. The positioning of second monitor 140 when secured to monitor mount 160 may be such that the communications interface 148 on second monitor 140 aligns with the communications interface 166 of monitor mount 160 to allow, for example, a direct connection (e.g., electrical connection). In other variations, the communications interface 148 of second monitor 140 exchanges data with the communications interface 166 of monitor mount 160 wirelessly (via, for example, optical communication by way of respective optical windows on second monitor 140 and monitor mount 160). For example, both communication interfaces 128 and 166 may include bi-directional phototransceivers that are configured for bi-directional communication. These connections (electrical, optical, wireless, etc.) may be used to sense position (docking, undocking) as well as the type of monitor mount 160 out of a plurality of types of mounts. The communications interface 148 of second monitor 140 may be located on a back portion of second monitor 140. The communications interface 148 of second monitor 140 may be located on a back facing portion of second monitor 140, whereas the communications interface 166 may be located on a front facing portion of monitor mount 160 so that the back facing portion and the front facing portion face each other when second monitor 140 is mounted to monitor mount 160.

The positioning of second monitor 140 when secured to monitor mount 160 may also align the power source/conduit 150 of second monitor 140 to be coupled to the power source/conduit 168 of monitor mount 160 to allow monitor mount 160 to power second monitor 140 or vice-versa. In some variations, the positioning of second monitor 140 when secured to monitor mount 160 and/or when first monitor 120 is also secured to monitor mount 160 may also align the power source/conduit 150 of second monitor 140 to be coupled to the power source/conduit 132 of first monitor 120 (which in turn is connected to the power source/conduit 168 of monitor mount 160) which causes first monitor 120 to power second monitor 140.

The modular mounting of the three devices 120, 140, and 160 will now be described in greater detail. The modular mounting may allow first monitor 120 to dock into monitor mount 160 from the front surface of monitor mount 160, allow first monitor 120 to dock into monitor mount 160 by sliding first monitor 120 in from the left and/or the right lateral side of monitor mount 160, allow the combination of first monitor 120 and second monitor 140 to dock to monitor mount 160, allow first monitor 120 to slide out of the combination of monitor mount 160 and second monitor 140 while monitor mount 160 and second monitor 140 remain mechanically coupled to one another, allow second monitor 140 to be mounted to monitor mount 160 in the absence of first monitor mount 120, and any combination thereof.

FIGS. 2 through 10 show a first embodiment of modular system 100, including first monitor 120, second monitor 140, and monitor mount 160. Referring to FIGS. 2 through 5, second monitor 140 has a pair of mounting brackets 141a, 141b that engage a complimentary shaped recess 121 in first monitor 120. This structure permits the flexibility for first monitor 120 to be inserted from either the right edge 141 (see FIGS. 2-3) or left edge 143 of second monitor 140.

Optionally, the fully inserted/engaged position the horizontal centerline 123 of first monitor 120 may be offset from the horizontal centerline 149 of second monitor 140. Accordingly, when first monitor 120 is inserted from the right edge 141 (FIGS. 2-3), the horizontal centerline 123 of first monitor 120 is offset to the right of the horizontal centerline 149 of second monitor 140. Similarly, when first monitor 120 is inserted from the left edge 143 (FIGS. 4-5), the horizontal centerline 123 of first monitor 120 is offset to the left of the horizontal centerline 149 of second monitor 140.

Figure 2:
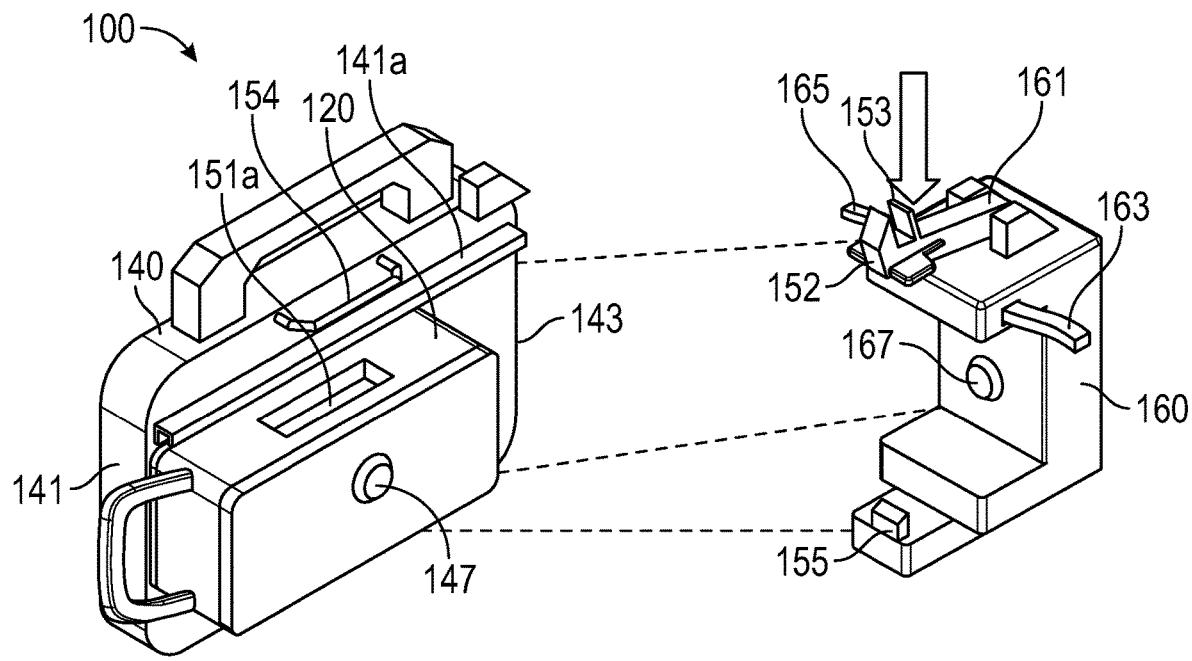
FIG. 2 is a schematic diagram showing a monitor mount and a first monitor secured to a second monitor, having been inserted from the right edge of the second monitor.
Figure 3:
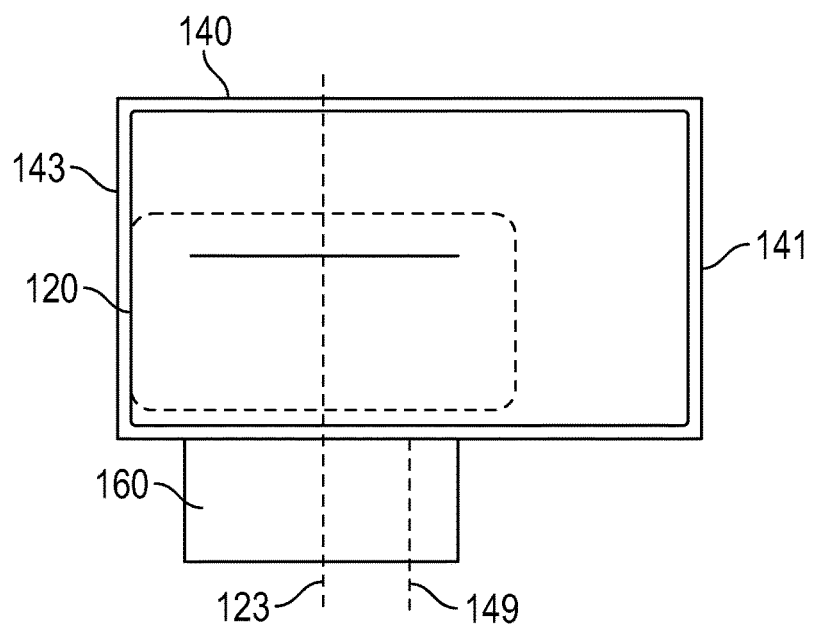
FIG. 3 is block diagram showing the relative positions of the first monitor, second monitor, and monitor mount with the smaller monitor in the position shown in FIG. 2.
Figure 4:
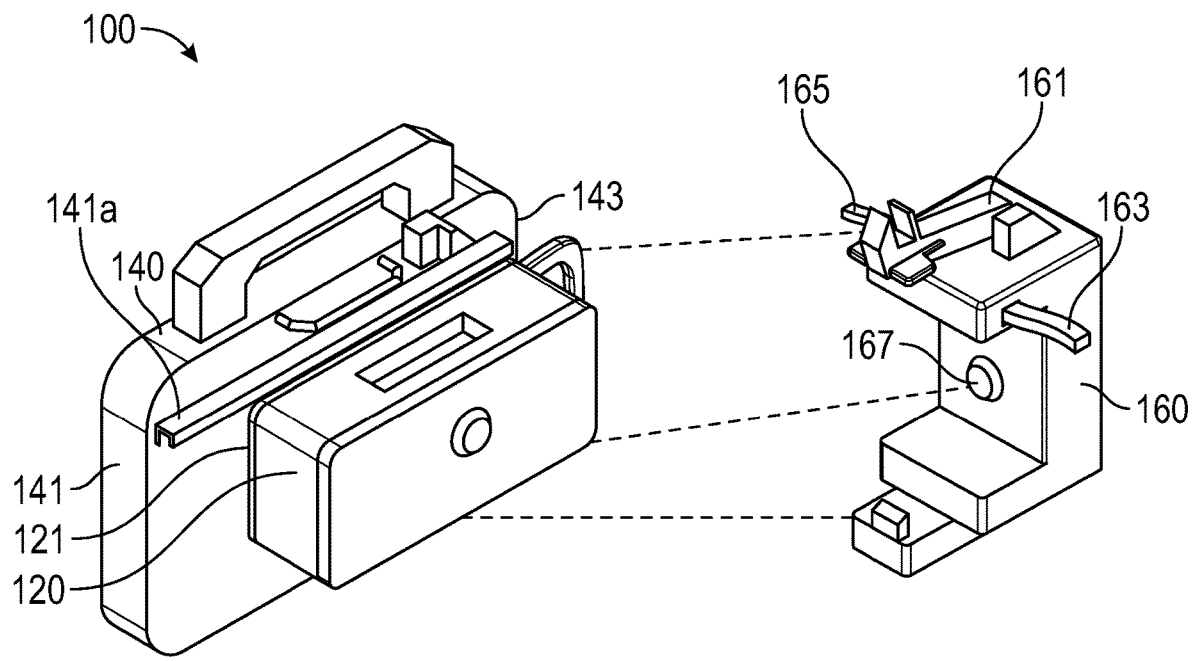
FIG. 4 is a schematic diagram showing the monitor mount and the first monitor secured to the second monitor, having been inserted from the left edge of the second monitor.
Figure 5:
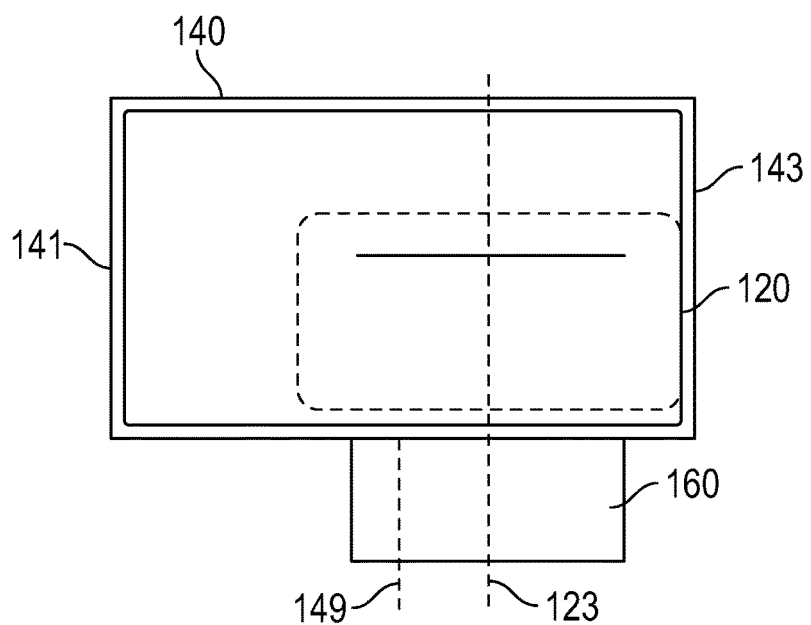
FIG. 5 is block diagram showing the relative positions of the first monitor, second monitor, and monitor mount with the small monitor in the position shown in FIG. 4.

In order to permit electrical connections between first monitor 120 and monitor mount 160 in either the left insert or right insert positions, monitor mount 160 may include an electrical interface 167. The electrical interfaces 147, 167 of first monitor 120 and monitor mount 160, respectively, are shown in FIGS. 2 and 4. It should be understood that these electrical interfaces 147, 167 may include multiple electrical contacts for power and data transmission.

Figure 6:
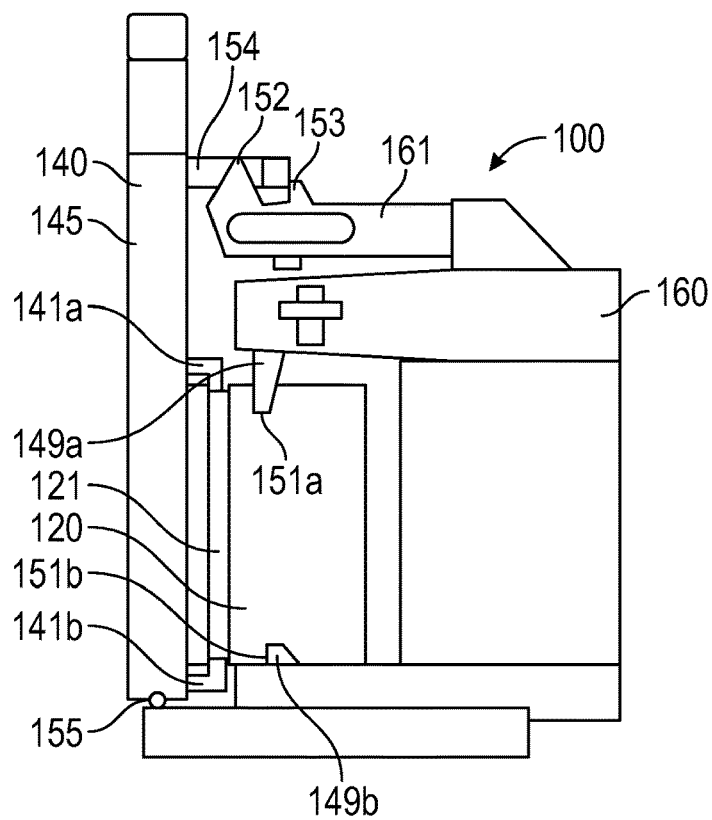
FIG. 6 is a schematic diagram showing the monitor mount engaged with the first and second monitors.

As illustrated in FIG. 6, monitor mount 160 includes upper and lower arms 149a, 149b which selectively engage upper and lower coupling recesses 151a, 151b in first monitor. Monitor mount 160 also includes an engagement arm 161 having a pair of upwardly extending protrusions 152, 153 that engage a mounting bar 154 that extends rearwardly from second monitor 140. The mounting bar 154 is preferably wider than the protrusions 152, 153, so as to define an opening of sufficient width to permit engagement with the protrusions 152, 153 in both the left insert (FIGS. 2-3) and right insert (FIGS. 4-5) configurations for first monitor 120. Lastly, monitor mount 160 includes a pivot protrusion 155 that engages complimentarily-shaped slot (not labeled) located in the lower edge of second monitor 140.

Figure 7:
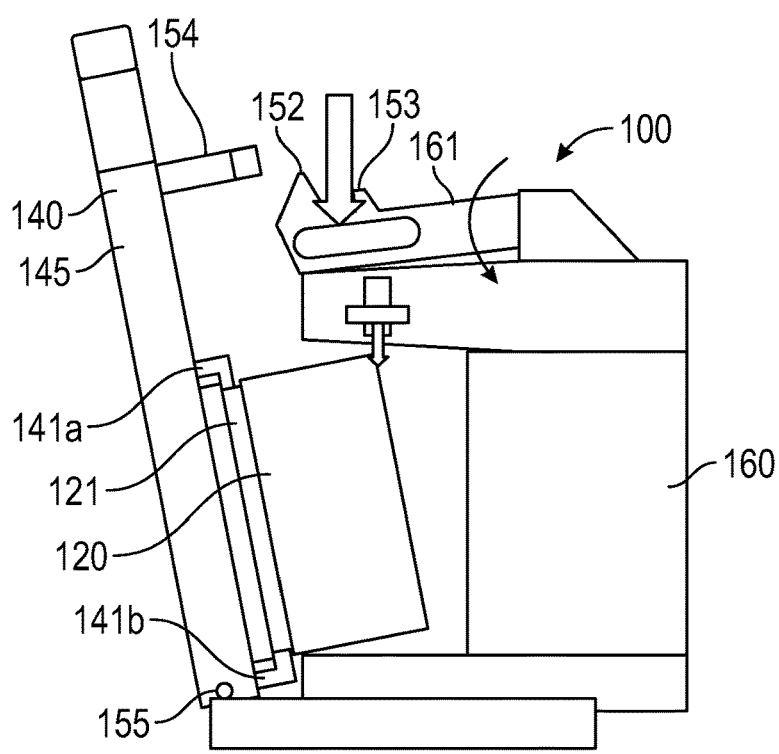
FIG. 7 is a schematic diagram showing the first and second monitors being released from the monitor mount.

In order to simultaneously remove the first and second monitors 120, 140 from monitor mount 160, the user presses downwardly on the engagement arm 161 (see FIGS. 2 and 7). When the engagement arm 161 is in a downward position, the protrusions 152, 153 disengage from the mounting bar 154 and the upper and lower arms 149a, 149b retract and disengage from the upper and lower coupling recesses 151a, 151b, which release both the first and second monitors 120, 140. In order to provide the functionality described above, monitor mount may include a linkage that causes the upper and lower arms 149a, 149b to disengage when the engagement arm 161 is pressed downwardly. Any suitable mechanical or electrical linkage may be used to provide this functionality Pivot protrusion 155 provides an axis about which second monitor 140 can pivot until first and second monitors 120, 140 are clear of monitor mount 160 and can be lifted away. Simultaneously engaging first and second monitors 120, 140 with monitor mount 160 is accomplished by reversing the disengagement steps described above. Engagement arm 161 and upper and lower arms 149a, 149b are preferably biased into engagement positions so that first and second monitors 120, 140 snap into an engaged position without the need for any user engagement of the engagement arm 161.

Figure 8:
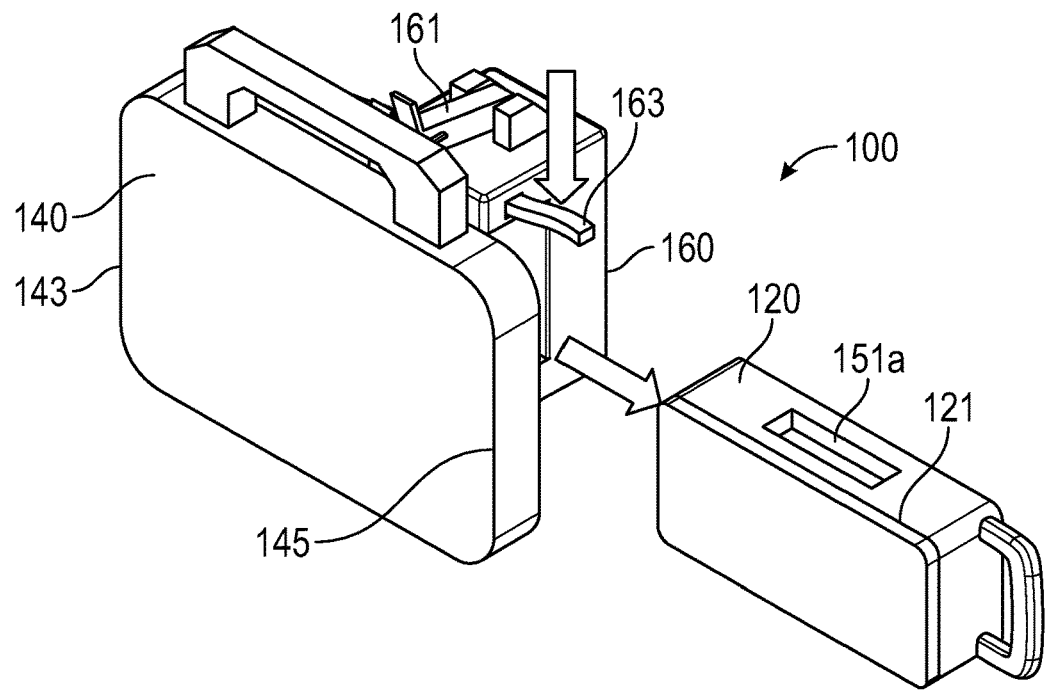
FIG. 8 is a schematic diagram showing a perspective view of the first monitor being removed from the mount and the second monitor.
Figure 9:
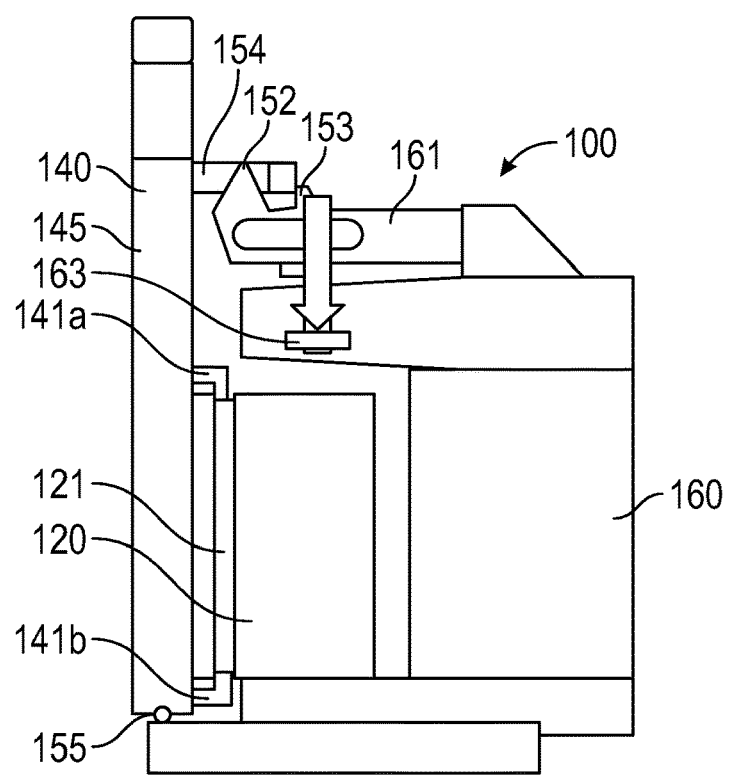
FIG. 9 is side view of the schematic diagram of FIG. 8.

As shown in FIGS. 8 and 9, inserting/docking first monitor 120 when second monitor 140 is already docked to monitor mount 160 is accomplished by depressing the release lever 163 and sliding first monitor 120 into the mounting brackets 141a, 141b, then releasing the release lever 163. Inserting or removing first monitor 120 in the left side configuration is accomplished using the same steps, but first monitor 120 is inserted or removed from the left edge 143 of second monitor 140. Optionally, a second release lever 165 that selectively disengages the upper and lower arms 149a, 149b may be provide on the left side of monitor mount 160 to provide a lever that is more proximate to the location of a left side removal or insertion of first monitor 120.

Figure 10:
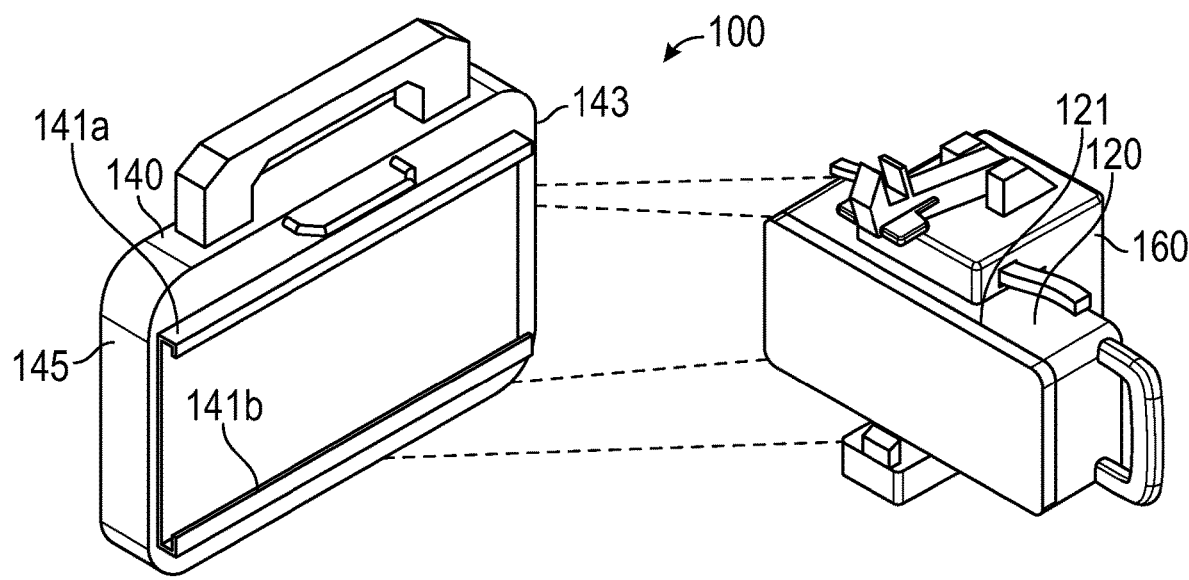
FIG. 10 is a schematic diagram showing the first monitor engaged with the monitor mount and the second monitor disengaged from the monitor mount.

As shown in FIG. 10 monitor mount 160 is also capable of docking first monitor 120 when second monitor is not engaged with first monitor 120 or monitor mount 160.

Figure 11:
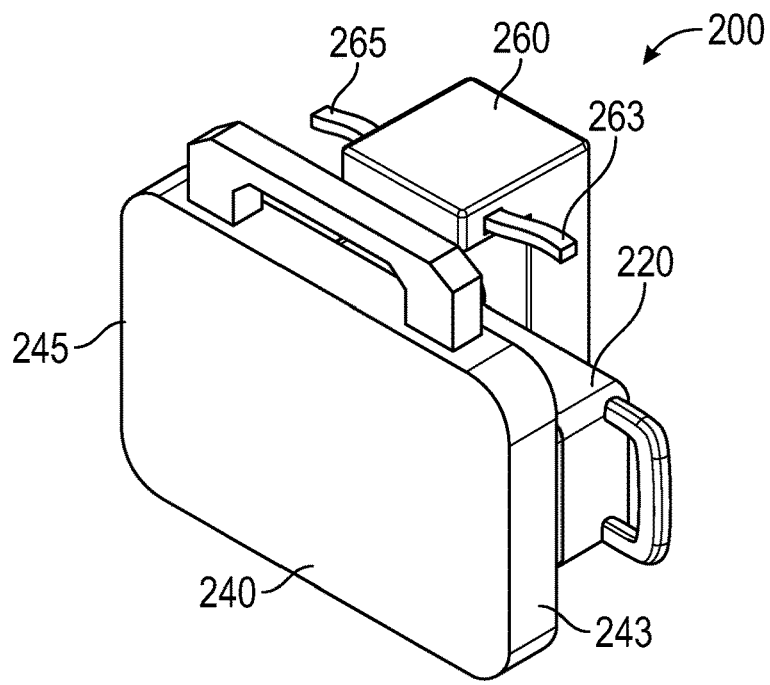
FIG. 11 is a schematic diagram showing a perspective view of a second embodiment of the first monitor mount, second monitor, and monitor mount, shown with both the first and second monitors engaged with the monitor mount.
Figure 12:
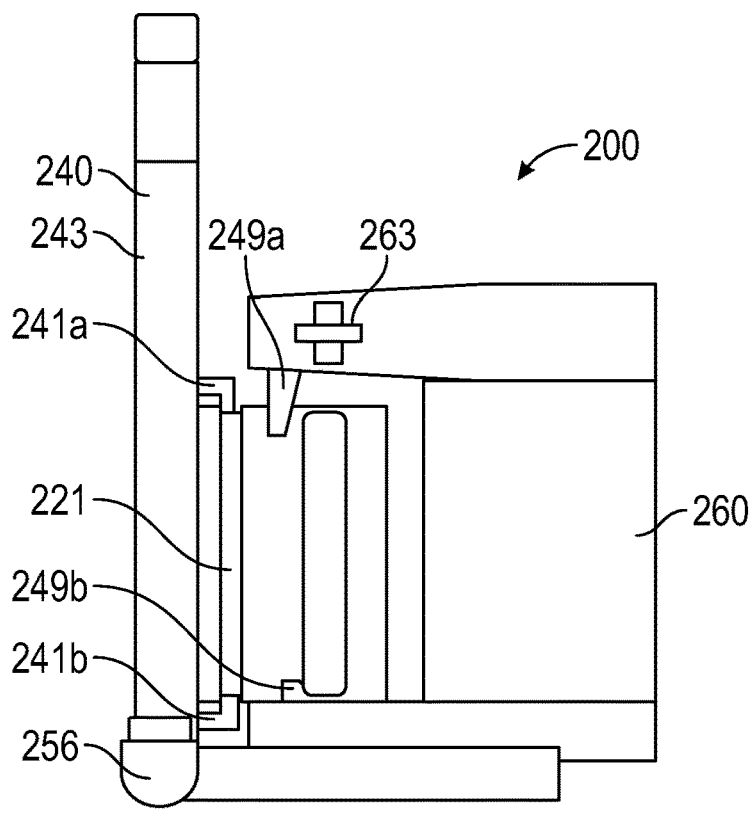
FIG. 12 is a side view of the diagram shown in FIG. 11.

FIGS. 11 through 17 show a second embodiment of a modular system 200, including first monitor 220, second monitor 240, and monitor mount 260. Referring to FIGS. 11 and 12, monitor mount 260 includes and upper and lower arms 249a, 249b, which can be selectively retracted by depressing either lever 263 or lever 265. For example, first monitor 120 in FIGS. 1 through 10 corresponds to first monitor 220 in FIGS. 11 through 17. In the interest of brevity, elements of the second embodiment that are substantially identical to a corresponding element in the first embodiment may be numbered in the drawings but may not be identified and described in the specification.

Referring to FIGS. 11-17, second monitor 240 has a pair of mounting brackets 241a, 241b that engage a complimentary shaped recess 221 in first monitor 220. This structure permits the flexibility for first monitor 220 to be inserted from either the right edge 243 or left edge 245 of second monitor 240.

Figure 15:
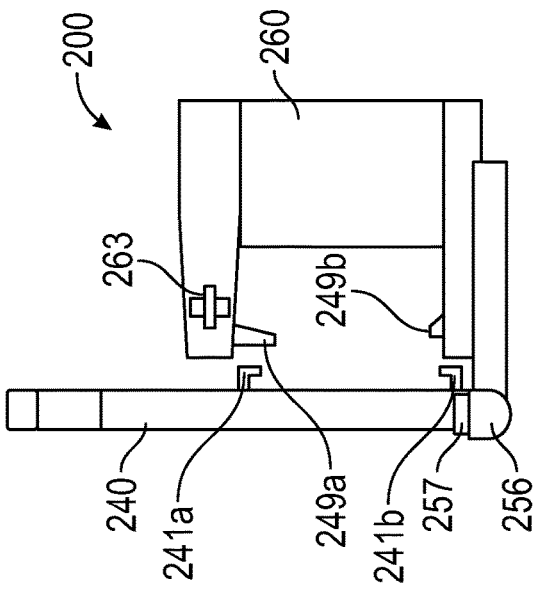
FIG. 15 is a schematic diagram showing the second monitor engaged with the monitor mount in a folded position.
Figure 14:
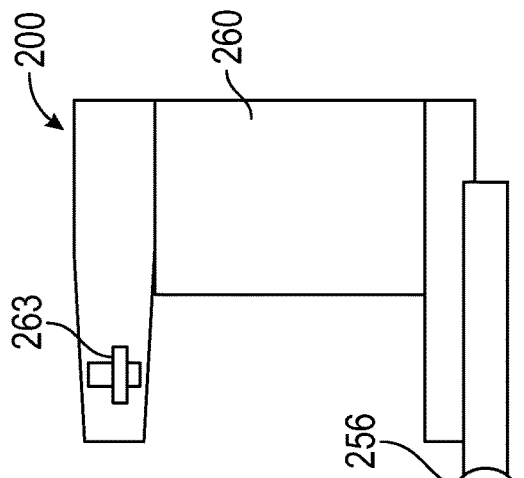
FIG. 14 is a schematic diagram showing the second monitor engaged with the monitor mount in an unfolded position.
Figure 13:
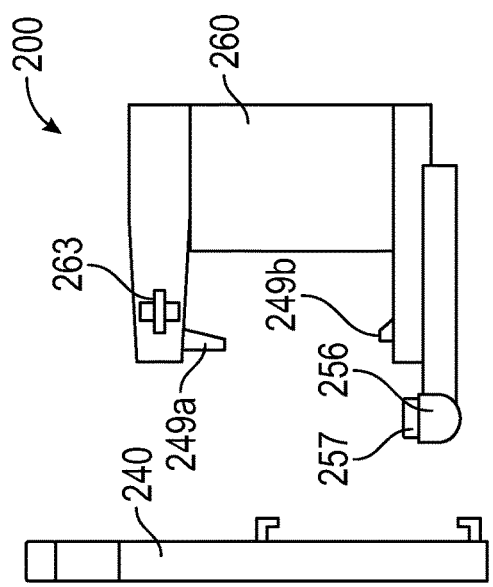
FIG. 13 is a schematic diagram showing the second monitor disengaged from the monitor mount.

Referring to FIGS. 13-15, second monitor 240 is removably connectable to monitor mount 260 with a hinged engagement joint 256 having a protrusion 257 that either mechanically or magnetically engages the lower edge of second monitor 240. Hinged engagement joint 256 is preferably adapted to allow second monitor to pivot from an upright position (FIG. 15) to a prone position (FIG. 14) when either of levers 263, 265 is depressed. Any suitable linkage (mechanical or electrical) may be used to provide this functionality. When neither of levers 263, 265 is depressed, hinged engagement joint 256 is preferably locked in a fixed rotational position, in order to prevent accidental pivoting of second monitor 240.

Figure 16:
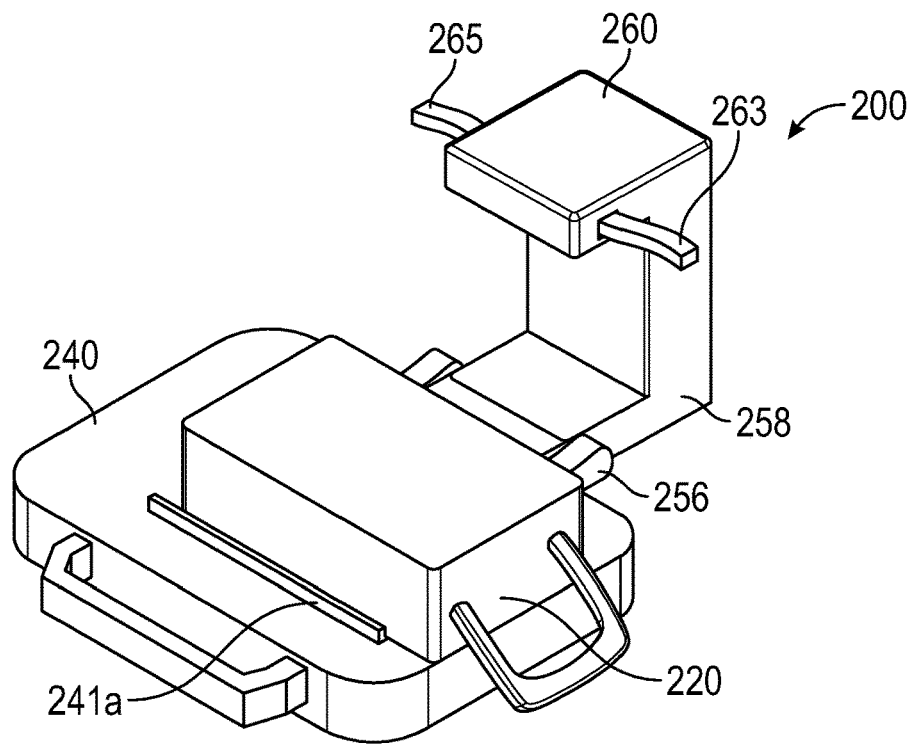
FIG. 16 is a schematic diagram showing a perspective view of a second embodiment, showing the second monitor in an unfolded position and the first monitor attached thereto.
Figure 17:
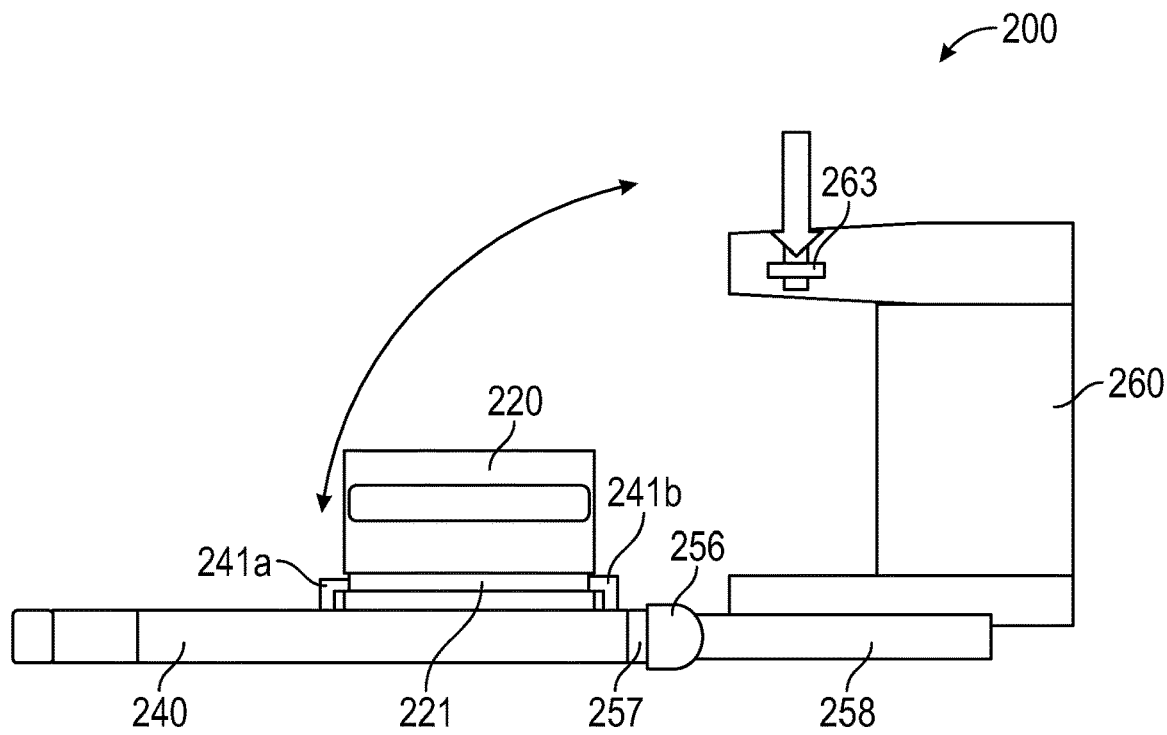
FIG. 17 is a side view of the schematic diagram shown in FIG. 16.

Referring to FIGS. 16 and 17, enabling second monitor 240 to be pivoted into a prone position while remaining attached to monitor mount 260 provides for very convenient access to the rear of second monitor 240 for docking and removing first monitor 220. First monitor 220 may be docked by pivoting second monitor 240 into the prone position while engaged with hinged engagement joint 256, then sliding first monitor into mounting brackets 241a, 241b. When first monitor 220 is fully engaged with second monitor 240, one of levers 263, 265 is depressed and second monitor 240 (with first monitor 220 attached) is pivoted into an upright position and one of levers 263 and 265 is released, which causes upper and lower arms 249a, 249b to engage upper and lower coupling recesses 251a, 251b of first monitor 220.

Although not shown in the drawings, this embodiment also permits first monitor 220 to be docked with monitor mount 260 without second monitor 240 in a manner very similar to FIG. 10.

It additional embodiments, monitor mounts 160, 260 may include different structures to provide the functionality of the engagement arm 161, the upper and lower arms 149a, 149b, hinged engagement joint 256, and protrusion 257. Such structures may include any mechanical attachment structures, such as a ledge, a rail, a rib, an abutment, a detent, a cleat, and the like, or any combination thereof. Monitor mounts 160, 206 may additionally or alternatively include different securing mechanisms including magnetic and/or electromagnetic locking mechanisms to allow first monitor 120 and/or second monitor 140 to selectively be secured to monitor mount 160.

Although various embodiments have been described above, these are to be regarded as merely examples. Accordingly, those of ordinary skill in the art will recognize that various changes and modifications of the examples described herein can be made without departing from the spirit and scope of the present disclosure. For example, any feature of any particular portion, embodiment or modification of monitors 120, 140 may be included or omitted from any of the other portions, embodiments or modifications of monitors 120, 140. Any feature of any particular portion, embodiment or modification of monitor mount 160 may be included or omitted from any of the other portions, embodiments or modifications of monitor mount 160.

The invention claimed is:

1. A system, comprising:
a first patient monitor including:
a mount electrical interface,
a first monitor coupling;
a second monitor coupling;
a first monitor interface; and
a sensor interface electrically connectable to a plurality of patient physiological sensors;
a second patient monitor including:
a third monitor coupling that mechanically engages the first monitor coupling of the first patient monitor to removably receive the first patient monitor when the first patient monitor is docked to the second patient monitor;
a second patient monitor interface that electrically mates with the first monitor interface when the first patient monitor is docked to the second patient monitor to convey electrical signals between the first patient monitor and the second patient monitor; and
a fourth monitor coupling; and
a patient monitor mount including:
a first mount coupling assembly that mechanically engages the second monitor coupling when the first patient monitor is releasably docked with the patient monitor mount;
a second mount coupling assembly that mechanically engages the fourth monitor coupling when the second patient monitor is releasably docked with the patient monitor mount, and
a third monitor interface that electrically mates with the mount electrical interface of the first patient monitor when the first patient monitor is releasably docked with the patient monitor mount to convey electrical signals and power,
wherein the releasing is performed by manual actuation of a mechanical mechanism that withdraws a mechanical engagement of the patient monitor mount with the respective patient monitor,
wherein:
the first mount coupling assembly includes:
an engagement arm having at least one protrusion; and
an upper arm and a lower arm that retract and disengage the second monitor coupling when the engagement arm is actuated by disengaging a mounting bar located on a rear side of the second monitor from the protrusion of the engagement arm; and
a second mount coupling includes a release lever that, when actuated, disengages the fourth monitor coupling.

2. The system of claim 1, wherein the first mount coupling assembly, the second mount coupling assembly, the first monitor coupling and the second monitor coupling permit the first patient monitor to be removably received by the second patient monitor from a left side of the second patient monitor and a right side of the second patient monitor.

3. The system of claim 1, wherein the first patient monitor is located in a different position relative to the second patient monitor when being removably received from the left side of the second patient monitor than when removably received from the right side of the second patient monitor.

4. The system of claim 1, wherein the first mount coupling and the second monitor coupling permit the second patient monitor to be mounted in first and second positions in which a horizontal centerline of the second patient monitor is in a different position relative to the mount.

5. The system of claim 1, wherein:
the second monitor coupling includes an upper recess and a lower recess; and
the first mount coupling assembly comprises:
a retractable upper arm and a lower arm that mechanically engage the upper recess and the lower recess, the upper and lower recesses being complimentary in shape to the upper and lower arms; and
at least one lever operable to extend and retract the upper and lower arms to release the first patient monitor from the patient monitor mount.

6. The system of claim 1, wherein:
the engagement arm and the upper and lower arms are biased into engagement positions so that the first and second monitors snap into an engaged position absent a need for a user engagement.

7. The system of claim 1, wherein the second mount coupling assembly comprises a hinged engagement joint adapted to removably secure a lower edge of the second patient monitor and being adapted to pivot about a hinge axis.

8. The system of claim 7, wherein the hinged engagement joint is adapted to permit the second patient monitor to pivot from an upright position to a prone position while remaining secured to the mount.

9. A method of configuring a patient monitor mount, a first patient monitor, and a second patient monitor, the method comprising:
releasably docking the first patient monitor to the patient monitor mount without the second patient monitor being docked to the patient monitor mount;
docking the first patient monitor to the second patient monitor;
releasably docking the second patient monitor to the patient monitor mount without the first patient monitor being docked to the patient monitor mount;
releasably docking the first and second patient monitors to the patient monitor mount while the first patient monitor is docked to the second patient monitor; and
releasing the first patient monitor by depressing a release lever of a second mount coupling from the patient monitor mount while the second patient monitor is releasably docked to the patient monitor mount and without releasing the second patient monitor from the patient monitor mount,
the releasing is performed by manual actuation of a mechanical mechanism that withdraws a mechanical engagement of the patient monitor mount with the respective patient monitor.

10. The method of claim 9, wherein docking the first patient monitor to the second patient monitor further comprises docking the first patient monitor to the second patient monitor from a left side of the second patient monitor and docking the first patient monitor to the second patient monitor from a right side of the second patient monitor.

11. The method of claim 10, wherein docking the first patient monitor to the second patient monitor further comprises docking the first patient monitor to the second patient monitor from a left side of the second patient monitor into a first position and docking the first patient monitor to the second patient monitor from a right side of the second patient monitor into a second position.

12. The method of claim 9, further comprising prior to docking the first patient monitor to the second patient monitor, pivoting the second patient monitor from an upright position to a prone position, while remaining docked to the mount.

13. A patient monitor mount comprising:
a first mount coupling assembly adapted to mechanically engage a first patient monitor having a first monitor coupling to be releasably docked to the patient monitor mount, and
a second mount coupling assembly adapted to mechanically engage a second patient monitor having a second patient monitor coupling to be mechanically engaged to the patient monitor mount;
wherein:
the second mount coupling assembly is adapted to mechanically engage the second patient monitor to be releasably docked to the patient monitor mount while first patient monitor is removably received by the second patient monitor; and
the first monitor coupling assembly is adapted to mechanically engage to allow attachment and removal of the first patient monitor from the second patient monitor while the second patient monitor is secured to the patient monitor mount,
the releasing is performed by manual actuation of a mechanical mechanism that withdraws a mechanical engagement of the patient monitor mount with the respective patient monitor,
wherein:
the second mount coupling assembly includes an engagement arm having at least one protrusion that is adapted to engage a mounting bar located on the rear side of the second patient monitor; and
the second mount coupling includes a release lever that, when actuated, disengages the first patient monitor.

14. The patient monitor mount of claim 13, wherein the first mount coupling assembly permits the first patient monitor to be removably received by the second patient monitor from a left side of the second patient monitor and a right side of the second patient monitor.

15. The patient monitor mount of claim 13, wherein the first mount coupling assembly is adapted to permit the second patient monitor to be mounted in first and second positions in which a horizontal centerline of the second patient monitor is in a different position relative to the patient monitor mount.

16. The patient monitor mount of claim 13, wherein the first mount coupling assembly comprises at least one lever operable to extend and retract an upper arm and a lower arm.

17. The patient monitor mount of claim 16, wherein the first monitor coupling comprises upper and lower recesses that are complimentary in shape to the upper and lower arms.

18. The system of claim 13, wherein the second mount coupling assembly comprises a hinged engagement joint adapted to removably secure a lower edge of the second patient monitor and being adapted to pivot about a hinge axis.

* * * * *